(12) United States Patent
Gemilang et al.

(10) Patent No.: US 10,618,644 B2
(45) Date of Patent: Apr. 14, 2020

(54) SYSTEM FOR DRIVING A SLAT DEVICE OF AN AIRCRAFT WING

(71) Applicant: Airbus Operations GmbH, Hamburg (DE)

(72) Inventors: Atra Surya Gemilang, Hamburg (DE); Marc Hencke, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 283 days.

(21) Appl. No.: 15/584,267

(22) Filed: May 2, 2017

(65) Prior Publication Data

US 2017/0320566 A1 Nov. 9, 2017

(30) Foreign Application Priority Data

May 3, 2016 (EP) .................................... 16168189

(51) Int. Cl.
| | |
|---|---|
| B64C 27/54 | (2006.01) |
| B64C 9/26 | (2006.01) |
| B64C 13/30 | (2006.01) |
| B64C 3/50 | (2006.01) |
| B64C 9/24 | (2006.01) |
| B64C 9/10 | (2006.01) |

(52) U.S. Cl.
CPC ................ *B64C 27/54* (2013.01); *B64C 3/50* (2013.01); *B64C 9/24* (2013.01); *B64C 9/26* (2013.01); *B64C 13/30* (2013.01); B64C 9/10 (2013.01); Y02T 50/14 (2013.01); Y02T 50/32 (2013.01)

(58) Field of Classification Search
CPC .... B64C 9/10; B64C 9/24; B64C 9/26; B64C 27/54; B64C 3/50; B64C 13/30; Y02T 50/14; Y02T 50/32
USPC .......................................................... 244/214
See application file for complete search history.

(56) References Cited

U.S. PATENT DOCUMENTS

| | | | | |
|---|---|---|---|---|
| 3,504,870 A | * | 4/1970 | Weiland ..................... | B64C 3/48 244/210 |
| 3,556,439 A | * | 1/1971 | Autry ........................ | B64C 3/38 244/210 |
| 3,743,219 A | * | 7/1973 | Gorges ...................... | B64C 9/24 244/210 |
| 4,189,121 A | * | 2/1980 | Harper ...................... | B64C 9/24 244/214 |
| 4,202,519 A | | 5/1980 | Fletcher | |
| 4,285,482 A | * | 8/1981 | Lewis ....................... | B64C 9/22 244/207 |
| 5,474,265 A | * | 12/1995 | Capbern ................... | B64C 9/24 244/214 |

(Continued)

FOREIGN PATENT DOCUMENTS

DE      10 2010 014 792 A1    10/2011

*Primary Examiner* — Bret Hayes
(74) *Attorney, Agent, or Firm* — Lorenz & Kopf LLP

(57) ABSTRACT

Disclosed herein is an exemplary embodiment of a system for driving a slat of an aircraft. The system includes first and second hinge support elements of a wing structure, a first arm device, a second arm device, and a third arm device. Also disclosed is an aircraft having the system, an aircraft wing having the system, and a method for driving a slat of an aircraft. The system utilizes a particular configuration of connection junctions, which rotatably connect the arm devices and the hinge support elements.

12 Claims, 9 Drawing Sheets

(56) References Cited

U.S. PATENT DOCUMENTS

| | | | | |
|---|---|---|---|---|
| 6,375,126 B1* | 4/2002 | Sakurai | ............... | B64C 3/50 |
| | | | | 244/214 |
| 7,270,305 B2* | 9/2007 | Rampton | ............... | B64C 9/22 |
| | | | | 244/213 |
| 8,226,048 B2* | 7/2012 | Beyer | ............... | B64C 9/22 |
| | | | | 244/201 |

\* cited by examiner

SYSTEM FOR DRIVING A SLAT DEVICE OF AN AIRCRAFT WING

CROSS-REFERENCE TO RELATED APPLICATION

This application claims the benefit of, and priority to, European patent application number EP 16 168 189.5, filed May 3, 2016.

TECHNICAL FIELD

Embodiments of the invention relate to a system for driving a slat of an aircraft wing, an aircraft wing comprising the system, and an aircraft comprising the system or the aircraft wing with the system.

BACKGROUND

In aircraft, in particular commercial aircraft, the demand for a high cruising speed as well as for a low take-off and landing speed is given, which rises the necessity of high lift systems, which can be activated during take-offs and landings to increase a lift coefficient. This is generally accomplished with lift-increasing devices, which are deflected into the airstream of the aircraft. Examples of such lift-increasing devices are extendable forward leading slats, such as Krueger slats, or rear trailing flaps, which are arranged so that they can be moved relative to the aircraft wing.

In an extended position, slats can be spaced or offset from the leading edge of the aircraft wing, thereby forming a gap relative to the leading edge of the aircraft wing. The gap allows an energy-rich stream of air to move from the flow approaching the aircraft wing onto the upper profile side of the aircraft wing, where it shifts the stall towards higher angles of attack. Depending on the design, slats can be deflected with or without forming a gap in the flow approaching the aircraft wing, and increase both the surface of the aircraft wing and its curvature.

Document DE 10 2010 014 792 A1 relates to a high lift system for an aircraft. To ensure that the aircraft wing contour comprises a contour optimized for cruise flight with the Krueger-slat in a retracted position, the aircraft wing comprises a depression for accommodating the Krueger-slat, wherein the shape of the Krueger-slat and the depression in the aircraft wing are adjusted to each other. In its retracted position, the Krueger-slat is in an "upside down" position, since the rear trailing edge of the Krueger-slat is in front of the forward leading edge of the Krueger-slat. In other words, the upper surface of the Krueger-slat forms a part of the lower surface of the aircraft wing, when being in its retracted position. In order to increase the lift coefficient during take-offs or landings, the Krueger-slat has to be rotated from the "upside down" position to an "upside up" position to reach an operating position, where the Krueger-slat is spaced or offset from the leading edge of the wing, thereby increasing the lift coefficient.

One problem associated with the deployment of the aforementioned Krueger-slat is that when such a Krueger-slat is swung from the retracted, "upside down" position to the operating, "upside up" position, the Krueger-slat is pivoted downwardly into the airstream and therefore is temporarily positioned broadside in the airstream. One disadvantage of this swing movement of the Krueger-slat is that the power requirements for deploying the Krueger-slat are relatively high.

Document U.S. Pat. No. 4,202,519 relates to an airfoil leading edge slat apparatus, which is configured to move the slat initially downward and forward and thereafter forward and upward, such that the slat is elevated above the front leading edge of the aircraft wing. One problem associated with this apparatus is still that a surface of the slat, now the lower surface of the slat, forms a part of the lower surface of the aircraft wing. Thus, the lower surface of the slat is not free in shape. One further disadvantage of this approach is that a part of the drive mechanism configured to drive the slat between the retracted position and the operating position is arranged outside the aircraft wing and therefore provides an increased air drag even during cruise configuration.

BRIEF SUMMARY

One aspect of the present invention may be to propose a system for driving a slat of an aircraft wing, which provides an increased lift coefficient during take-offs and landings as well as a low air drag during cruise configuration of the high lift system of the aircraft wing.

According to a first embodiment of the present invention, a system for driving a slat of an aircraft wing is provided, comprising a first, single piece, curved shaped arm device being rotatably connected to an aircraft wing structure, such that the corresponding pivotable end can be rotated between a first pivot position being arranged within the aircraft wing and a second pivot position at least partly encompassing the leading edge of the aircraft wing to be arranged in front of it. The system further comprises a second, linearly extendable arm device being rotatably connected to the aircraft wing structure and linked to the first arm device via a third arm device, such that a rotation of the second arm device is driven by a rotation of the first arm device. The pivotable end of the first arm device is configured to be rotatably connected to a rear portion of the slat and wherein a pivotable end of the second arm device is configured to be rotatably connected to a front portion of the slat.

As an effect, the system is configured to drive a slat from a retracted position to an operating position, wherein the slat is arranged within the aircraft wing during the retracted position and wherein the slat is arranged in front of the leading edge of the aircraft wing during the operation position, such that the slat increases the lift coefficient. Furthermore, by linking the first arm device and the second arm device, the slat is oriented in the retracted position, in the operating position, as well as during the deployment movement between said positions, such that a forward leading edge of the slat is constantly forward of a rear trailing edge of the slat. Consequently, an upper surface of the slat is always up, even in the retracted position as well as during its deployment.

As a further effect of the system, the slat may comprise any convenient outer surface shape, since the system allows to move the slat within the aircraft wing, such that a lower surface of the slat does not necessarily form a part of the lower surface of the aircraft wing.

As an even further effect of the system, the slat can be driven by the system between the retracted position and the operating position, such that a broadside of the slat is not, even not temporarily, positioned in the airstream. Consequently, less power is required to deploy the slat between its retracted position and operating position.

According to a second embodiment of the present invention, a system for driving a slat of an aircraft is provided, comprising: a first hinge support element of an aircraft wing structure, a second hinge support element of the aircraft wing structure, a first arm device, a second arm device and a third arm device. The first arm device is rotatably connected by an associated first connection junction to the first hinge support element, comprises a second connection junction being configured to be rotatably connected to a rear portion of the slat, has a steady curved shape between the first connection junction and the second connection junction, and comprises a third connection junction arranged between the first and the second connection junction of the first arm device. The second arm device is linearly extendable, is rotatably connected by an associated first connection junction to the second hinge support element, comprises a second connection junction being configured to be rotatably connected to a front portion of the slat, and comprises a third connection junction arranged between the first and the second connection junction of the second arm device. The third arm device is rotatably connected by an associated first connection junction to the third connection junction of the first arm device and is rotatably connected by an associated second connection junction to the third connection junction of the second arm device.

The system according to the second embodiment of the present invention may be interpreted individually from the system according to the first embodiment of the present invention. In this context, reference is made to the features and effects provided for the system according to the first embodiment of the present invention.

Alternatively, the system according to the second embodiment of the present invention may be interpreted as an embodiment of the system according to the first embodiment of the present invention. In particular, features of the system according to the second embodiment of the present invention may be interpreted as optional features of the system according to the first embodiment of the present invention.

Features, effects and/or embodiments of the system described hereinafter may be interpreted as features, effects and/or embodiments of the system according to the first embodiment of the present invention, of the system according to the second embodiment of the present invention or as a combination of the systems according to the first and second embodiments of the present invention. Accordingly, the features, aspects and/or embodiments described hereinafter may not be limited to the system according to one of the embodiments of the present invention.

By rotating the first arm device, the second arm device is forced by the third arm device, preferably forming a linkage between the first and the second arm device, to rotate about the second hinge support element. Accordingly, the first arm device may be configured to drive the third arm device and the second arm device.

During a rotation of the first arm device, the system may be configured to initially move the slat downward and forward out of the aircraft wing. Thereafter, the system may be configured to continue a forward in combination with an upward movement followed by an afterward movement, whilst the slat is also rotated. The resulting combined movement ensuring that the slat is held in a final elevated position such that the lower side of the slat is held closer to the leading edge of the aircraft wing compared to the prior art. Since the first arm device has a steady curved shape, a collision with the aircraft wing is prevented. In this context, it is noted that the first, second and third junction of the first arm device are preferably spaced apart from each other, wherein the third junction is arranged between the first junction and the second junction.

Further, the curved shape of the first arm device may provide the effect that the slat can be moved upward during the last third, in particular during the last fifth, of the deployment movement of a slat between the retracted position and the operating position, such that the rear trailing edge of the slat is above the leading edge of the aircraft wing. As a result, the forward leading edge may also be moved upward during the last third, in particular during the last fifth, of the deployment movement, such that an enhanced flow, in particular an enhanced laminar flow, may be provided.

Even further, the curved shape of the first arm device may provide the effect that the slat can be moved during the last third, in particular during the last fifth, of the deployment movement of a slat between the retracted position and the operating position, such that the rear trailing edge of the slat is in overlap with leading edge section of the aircraft wing, because the first arm device may, due to its curvature, encompass the leading edge section of the aircraft wing at least partly. As a result, the slat may be subject to a backward movement during the previously-mentioned last third or fifth of the deployment movement. As a consequence, the lift coefficient may be increased.

According to an exemplary embodiment of the system, the first arm device is formed as a single piece arm device. As an effect, the mechanical complexity of the system for driving a slat may be reduced. In an example, the first arm device is formed by a single piece of a rigid and/or stiff material. In particular, the single piece form of the first arm device relates to the section of the first arm device being arranged between the first connection junction and the second connection junction.

According to an exemplary embodiment of the system, the first arm device is formed from multiple pieces, which are connected stiffly to each other. Each of the pieces may be formed by a rigid and/or stiff material. Thus, the first arm device is configured to provide the above described effects.

According to a further exemplary embodiment of the system, the second arm device comprises a first shaft element and a second shaft element. The first shaft element and the second shaft element are connected by a linear guide mechanism. The linear guide mechanism may be formed by a parallel or curved guide mechanism. The linear guide mechanism is configured to provide a translational shift between the first and the second shaft elements, such that the second arm device is linearly extendable. As a result, the second arm device can be extended or contracted in its length.

In an example, the second shaft element is mounted in a slideway of the first shaft element, or vice versa, such that the linear guide mechanism may be formed by the first and the second shaft elements. As an effect, the deployment movement of a slat between the retracted position and the operating position, or vice versa, may be dictated by a rotation of the first arm device resulting in an extension or contraction of the second arm device, and thereby following the dictated deployment movement of the slat and first arm device, respectively. As a further effect, the rotation of the second arm device is dictated by a rotation of the first arm device, since the third arm device provides a linkage between the first and the second arm device. As a result, the forward leading edge of the slat is steadily arranged forward to the rear trailing edge of the slat, which ensures a low air drag during the deployment of the slat between its retracted position and the operating position, or vice versa.

According to a further exemplary embodiment of the system, the first shaft element is rotatably connected by the associated first connection junction of the second arm device to the second hinge support element and comprises an associated third connection junction. Further, the second shaft element comprises the associated second connection junction of the second arm device. If a slat is connected to the second connection junction of the first arm device and to the second connection junction of the second shaft element, rotating the first arm device about the first hinge support forces a translational shift between the first and the second shaft elements, such that the second shaft slides relative to the first shaft element. Further, the first shaft element is linked to the first arm device via the third arm device, such that a rotation of the first arm device forces a rotation of the first shaft element resulting in a respective rotation of the whole second arm device.

According to a further exemplary embodiment of the system, the first arm device is rotatable about the first hinge support element at least between a first pivot position and a second pivot position, wherein in the first pivot position, the system is configured to arrange the slat in a retracted position within the aircraft wing, such that a forward leading edge of the slat is forward of a rear trailing edge of the slat. As a result, the slat is not arranged in the aircraft wing in an "upside down" orientation. Instead, the slat may be arranged in the aircraft wing in an "upside up" orientation. Reference is made to the previously explained effects in this context.

According to a further exemplary embodiment of the system, in the second pivot position of the first arm device, the system is configured to arrange the slat in an operation position outside the aircraft wing, such that the rear trailing edge of the slat is forward of a forward leading edge of the aircraft wing. As an effect, the slat may be arranged, such that the rear trailing edge of the slat is spaced or offset from the forward leading edge of the aircraft wing, thereby forming a gap relative to the forward leading edge of the aircraft wing. As a result, the gap allows an energy-rich airstream to move onto the upper surface of the aircraft wing, where it may shift the stall towards higher angles of attack.

According to a further exemplary embodiment of the system, in the second pivot position of the first arm device, the system is configured to arrange the slat in an operation position outside the aircraft wing, such that the rear trailing edge of the slat is arranged above the and in overlap with a forward leading edge of the aircraft wing. As an effect, the slat may be arranged, such that the rear trailing edge of the slat is spaced or offset from the forward leading edge of the aircraft wing, thereby forming a gap relative to the forward leading edge of the aircraft wing. As a result, the gap allows an energy-rich airstream to move onto the upper surface of the aircraft wing, where it may shift the stall towards higher angles of attack.

According to a further exemplary embodiment of the system, the forward leading edge of the slat is forward of the rear trailing edge of the slat, if the first arm device is in its second pivot position, such that the slat is in the operating position. As a result, the slat is oriented, both, in its retracted position as well as in its operation position, such that the forward leading edge of the slat is forward of the rear trailing edge of the slat. Consequently, the slat does not necessarily have to be swung about an angle greater than 120° or 180° during the deployment of the slat between the retracted position and the operating position. Instead, the system is preferably configured such that a rotation of the slat during the movement between the retracted position and the operation position is limited to less than 80°, 70°, 60° or 50°.

According to a further exemplary embodiment of the system, the system is configured to drive the slat from the retracted position to the operation position along a trajectory, such that the forward leading edge of the slat is constantly forward of the rear trailing edge of the slat. As an effect, preferably in reference with the context as previously described, swinging the slat about a rotational angle of greater than 90°, 120° or more is prevented. In an example, the system is configured to apply a rotation of the slat during the deployment of the slat between the retracted position and the operation position of less than 60°. Consequently, a position of the slat, in which a broadside of the slat is positioned in the airstream, is effectively prevented.

According to a further exemplary embodiment of the system, the system comprises a drive unit configured to drive at least one arm device of the system, in particular the first arm device. In an example, the drive unit is configured to drive the at least one arm device, in particular the first arm device, preferably at least between the first pivot position and the second pivot position. In an example, the drive unit may be configured as a hydraulic and/or an electrical drive unit.

According to a further exemplary embodiment of the system, the system comprises a, in particular further, drive unit being configured to drive a bottom panel of the aircraft wing. The bottom panel of the aircraft wing may be arranged at a lower surface of the aircraft wing. The bottom panel may be configured and/or provides a shape, such that the bottom panel may be integrated in the lower surface panel of the aircraft wing without a rise of the lower surface of the aircraft wing. Further, the bottom panel may be configured to be rotated, translated or moved, such that the bottom panel may provide a lower opening at the lower surface and/or lower surface panel of the aircraft wing, through which the slat can be moved during its deployment from the retracted position to the operating position. According to a further example, the system is configured to control the, in particular further, drive unit, such that the bottom panel opens the aircraft wing at the lower surface, such that the respective lower opening is provided before or during the deployment of the slat from the retracted position to the operating position, and/or vice versa.

According to a further exemplary embodiment of the system, the first arm device comprises a fourth connection junction. Further, the system comprises a fourth arm device being rotatably connected by an associated first connection junction to the fourth connection junction of the first arm device. Furthermore, the fourth arm device comprises a second connection junction being configured to be rotatably connected to the bottom panel of the aircraft wing. As an effect, rotating the first arm device drives the bottom panel, since the bottom panel is linked to the first arm device via the fourth device. As a result, a drive unit configured to drive the first arm device may also be used to drive the bottom panel. As a further effect, a movement of the slat and a rotation of the bottom panel may be coupled.

Even though the bottom panel has been explained in the previous paragraphs as a rotatable bottom panel, the bottom panel may alternatively be configured, for instance, as a slidable bottom panel. Therefore, the bottom panel may be slid between a closed position and an opening position, in order to provide the lower opening in the lower surface (panel) of the aircraft wing allowing the slat to be deployed from the retracted position to the operating position, and/or vice versa. Further, the fourth arm device or the further drive unit, respectively, may be configured to slide the bottom panel.

It is understood that, without repeating here all the explanations, preferred features, effects and advantages provided with reference to the system of the invention, the system according to the invention may also be intended as being configured to drive a flap in an analogous manner, as for driving the slat. Thus, all of the above explanations, preferred features, effects and advantages, although provided with reference to the slat, may also be intended as being implemented by the system for driving a flap instead of a flap, or generally for driving a high lift device, which may be a slat or a flap. Thus, the system may be configured to drive a slat or a flap.

According to a third embodiment of the present invention, an aircraft wing for an aircraft is provided, comprising: a wing structure, a slat and a system as explained. The first and the second hinge support elements are arranged within the aircraft wing and attached to the, preferably internal, wing structure of the aircraft wing. The second connection junction of the first arm device is rotatably connected to the rear portion of the slat. The second connection junction of the second arm device is rotatably connected to a front portion of the slat. As an effect of arranging the first and second hinge support elements within the aircraft wing and attaching them to the wing structure, the first and second arm devices are rotatable, such that the first and second arm devices are arranged within the aircraft wing, if the first arm device is in its first pivot position. As a further effect, rotating the first arm device into its first pivot position, the slat is also arranged within the aircraft wing. As a consequence, the slat does not necessarily form a part of the lower surface of the aircraft wing. The slat therefore may provide a lower surface with a, in particular steadily, concave shape. Further, the upper surface of the slat may have a, in particular steadily, convex shape. Generally, the slat may have an arbitrarily outer surface shape.

Furthermore, reference is made to the effects, features and/or embodiments, which have been previously described in context with the system.

According to an exemplary embodiment of the aircraft wing, the first hinge support element is arranged at a first internal, forward leading section of the aircraft wing structure, and wherein the second hinge support element is arranged behind, in particular rearward to, the first section of the aircraft wing structure at a second internal section of the aircraft wing structure. As a result, the first arm device may be of a small size in length between its first and second connections junctions while being configured to rotate between the first pivot position and the second pivot position, in which the first arm device at least partly encompasses the leading edge of the aircraft wing, such that the corresponding pivotable end of the first arm device is arranged in front of the leading edge of the aircraft wing. Furthermore, due to the small size of the first arm device, the first arm device may be arranged within the aircraft wing, when being rotated in its first pivot position.

According to a further exemplary embodiment of the aircraft wing, the aircraft wing comprises a bottom panel, wherein the system is configured to move, in particular pivot, the bottom panel from a closed position to an open position before or while rotating the first arm device from the first pivot position to the second pivot position. As a result, the bottom panel may be moved, in particular pivoted, such that a lower opening is provided before or while the first arm is rotated between the first and second pivot position, such that the slat may be moved through said opening while being deployed from the retracted position to the operating position. In an example, the system may be configured to close the bottom panel, at least partly, while the first arm device is in its second pivot position and/or while the slat is in its operating position.

According to a further exemplary embodiment of the aircraft wing, the further drive unit or the second connection junction of the fourth arm device is, in particular rotatably, connected to the bottom panel, such that the bottom panel may be moved, in particular pivoted, between the closed position and the open position. In case the further drive unit serves for moving the bottom panel, the system may be configured to control the further drive unit accordingly. In case the bottom panel is moved via the linkage to the first arm device provided by the fourth arm device, a forced movement of the bottom panel is provided while rotating the first arm device.

According to a fourth embodiment of the present invention, an aircraft includes the system as described and/or an aircraft wing as described.

Reference is made to the effects, features and/or embodiments as described with respect to the system and/or the aircraft wing.

According to a fifth embodiment of the present invention, a method for driving a slat of an aircraft is provided. The method comprises the steps:

a) driving the slat out of a lower opening of an aircraft wing in a downward and forward movement;

b) driving the slat thereafter in an upward and forward movement in front of the aircraft wing; and c) driving the slat thereafter in an upward and backward movement.

When driving the slat in front of the aircraft wing, the rear trailing edge of the slat is in front of the leading edge surface panel of the aircraft wing, at least temporarily. Thereafter, the slat is further moved upward and backward. As an effect, the rear trailing edge of the slat is brought closer to the leading edge surface panel of the aircraft wing, such that a gap between the rear trailing edge of the slat and the surface of the aircraft wing may be reduced. As a further effect, the backward movement of the slat allows to arrange the rear portion of the slat in overlap with the front portion of the aircraft wing, such that an enhanced flow characteristic may be provided, in particular where enhanced flow conditions, in particular enhanced laminar flow conditions, are sought.

According to an exemplary embodiment of the method, the forward leading edge is and/or remains forward to a rear trailing edge during driving steps a), b) and c). In particular, the forward leading edge of the slat is forward to a rear trailing edge of the slat, when starting the drive movement in step a). Thereafter, in particular during the remaining driving movement in step a), as well as during the driving movements in steps b) and c), the forward leading edge of the slat remains forward to a rear trailing edge of the slat. As the driving steps a), b) and c) are performed directly one after another, the forward leading edge is and/or remains forward to a rear trailing edge during the whole deployment movement of the slat.

As a result, during the movement of step a) the slat may be driven out of the interior of the aircraft wing through the lower opening of the aircraft wing, wherein the orientation of the chord line of the slat may remain basically unchanged. In other words, the slat may be moved out of the interior of the aircraft wing through the lower opening by a basically parallel movement. As a result, the drag caused by the slat during the movement of step a) may be kept small.

As a further effect, the forward leading edge of the slat remains forward to the rear trailing edge of the slat during the whole deployment movement provided by steps a) to c). Accordingly, the slat may be subject to a limited rotation between its retraced position in the aircraft wing and its operation position at the end of the movement provided by step c), as the slat is not to be flip over from an upside-down orientation to an upside-up orientation. Consequently, less power is required to deploy the slat between its retraced position and its operating position.

According to an exemplary embodiment of the method, at least in step b) and/or in step c), the movement of the slat further comprises a rotation component in order to decrease an angle of attack of the slat. In a further example, in step a), the movement of the slat also comprises a rotation component in order to decrease an angle of attack. As a result, in steps a), b) and/or c), the slat may be a subject of a rotation, such that the angle of attack of the slat is decreased. In particular, the rotation component may result in a continuous decrease of the angle of attack of the slat. As a result, a smooth movement and/or a movement without an interruption of the rotation may be provided, which provides positive dynamic effects.

According to a further exemplary embodiment of the method, a larger decrease of angle of attack is performed during step b) than during step a) and/or c). As a result, in particular during step a), the slat is subject to a small decrease of angle of attack, such that the slat may be driven out of the aircraft wing through the lower opening without causing a large drag effect. As a further effect, the influence of the slat during the movement of step a) with regard to the lift coefficient may be kept small.

During step b), the slat may be subject to the largest decrease of the angle of attack of the slat. As a result, the slat may be brought into an orientation as it is designated for the final operation position of the slat. Having at least basically the designated orientation, and thus a correspondingly designated angle of attack, the slat may be moved during step c) further upward and backward, such that the slat, and in particular its rear portion, may be brought closer to the aircraft wing. In particular, the movement of step c) may be configured, such that the rear trailing edge is above and in overlap with a front section of the aircraft wing. It is further preferred, that a gap between the rear trailing edge of the slat and the surface of the aircraft wing is kept small. This has a positive effect on the lift coefficient and at the same time enhances the flow, in particular the laminar flow.

It is understood that, without repeating here all the explanations, examples, features and/or advantages provided with reference to the system, the method of the invention is intended to be configured to carry out the method steps for which the device is configured to. Thus, all the above examples, explanations, features and/or advantages, although provided with reference to the system, are also to be intended as being provided in an analogous manner for the method.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Additional features, advantages and possible applications of the disclosed subject matter may be gleaned from the following description of the exemplary embodiments and the figures. Furthermore, the same reference signs in the figures denote the same or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
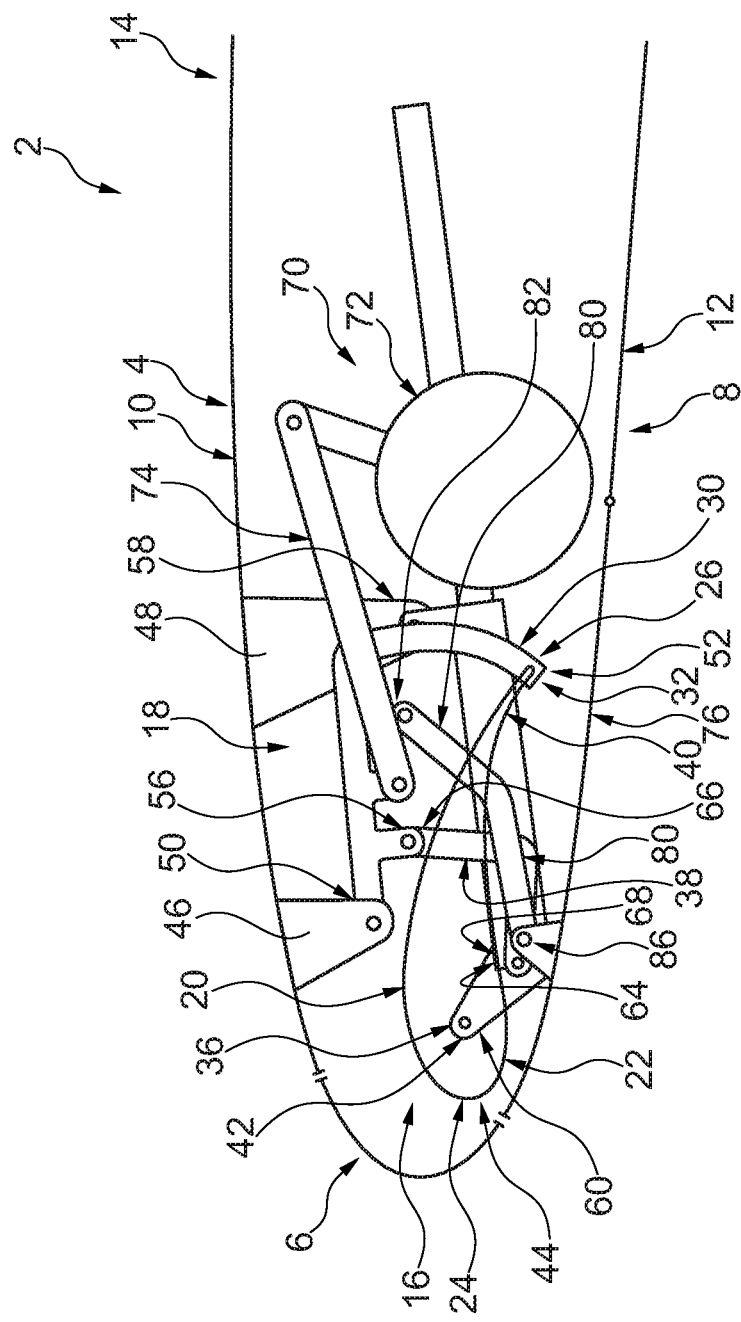
FIG. 1 schematically illustrates in a first example the aircraft wing comprising the system in a cross-sectional view.

FIG. 1 shows a part of an aircraft wing 2 in a schematic cross-sectional view. The aircraft wing 2 as such comprises an upper surface panel 4, a leading edge surface panel 6 and a lower surface panel 8. The panels 4, 6, 8 may be continuously or separately formed. The upper surface panel 4 forms an upper surface 10 of the aircraft wing 2. The lower surface panel 8 forms a lower surface 12 of the aircraft wing 2. It is to be understood that the aircraft wing 2 may be constructed in a conventional and/or arbitrary manner. In particular, the aircraft wing 2 may comprise spanwise-oriented wing spars (not shown) located within the aircraft wing 2. Further, the aircraft wing 2 may comprise ribs (not shown) extending between the wing spars, in particular at spaced intervals along a spanwise dimension of the aircraft wing 2. The upper surface panel 4, the leading edge surface panel 6, the lower surface panel 8, the wing spars and/or the ribs may form or may be a part of the wing structure 14 of the aircraft wing 2. The wing structure 14 may also be referred to as the aircraft wing structure.

As shown in FIG. 1, there is also schematically illustrated a slat 16 and a system 18 for driving the slat 16. The slat 16 is preferably formed as a rigid slat. The slat 16 comprises an upper surface panel 20, a lower surface panel 22, a forward leading edge 24 and a rear trailing edge 26, which may be separately or integrally formed. In particular, one of the panels may be integrally formed with one of the edges.

Figure 5:
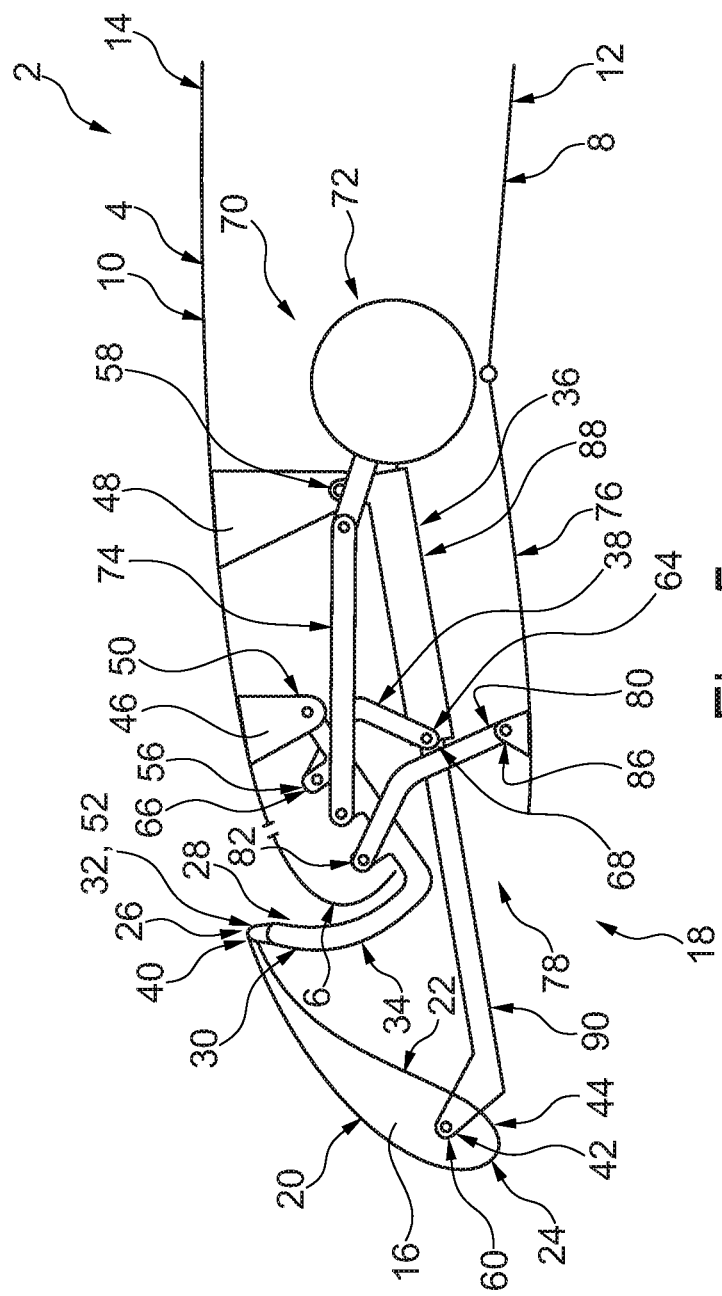
FIG. 5 schematically illustrates in a further example the aircraft wing comprising the system in a cross-sectional view.

As illustrated in FIG. 1, the slat 16 may be arranged within the aircraft wing 2. This position of the slat 16 is referred to as the retracted position of the slat 16. In order to increase the lift coefficient, in particular during take-offs and landings, the slat 16 is to be arranged forward of the leading edge 6 of the aircraft wing 2, as it is exemplarily shown in FIG. 5, preferably such that a gap 28 is formed between the leading edge 6 of the aircraft wing 2 and the rear trailing edge 26 of the slat 16. The gap 28 allows an energy-rich stream of air to move from the flow approaching the aircraft wing 2 onto the upper surface panel 4, where it shifts the stall towards higher angles of attack. In FIG. 5, the position of the slat 16 is referred to as an example of the operation position of the slat 16. As can be seen from the FIGS. 1 and 5, the system 18 is configured to drive the slat 16 from the retracted position to the operation position, and vice versa.

Figure 2:
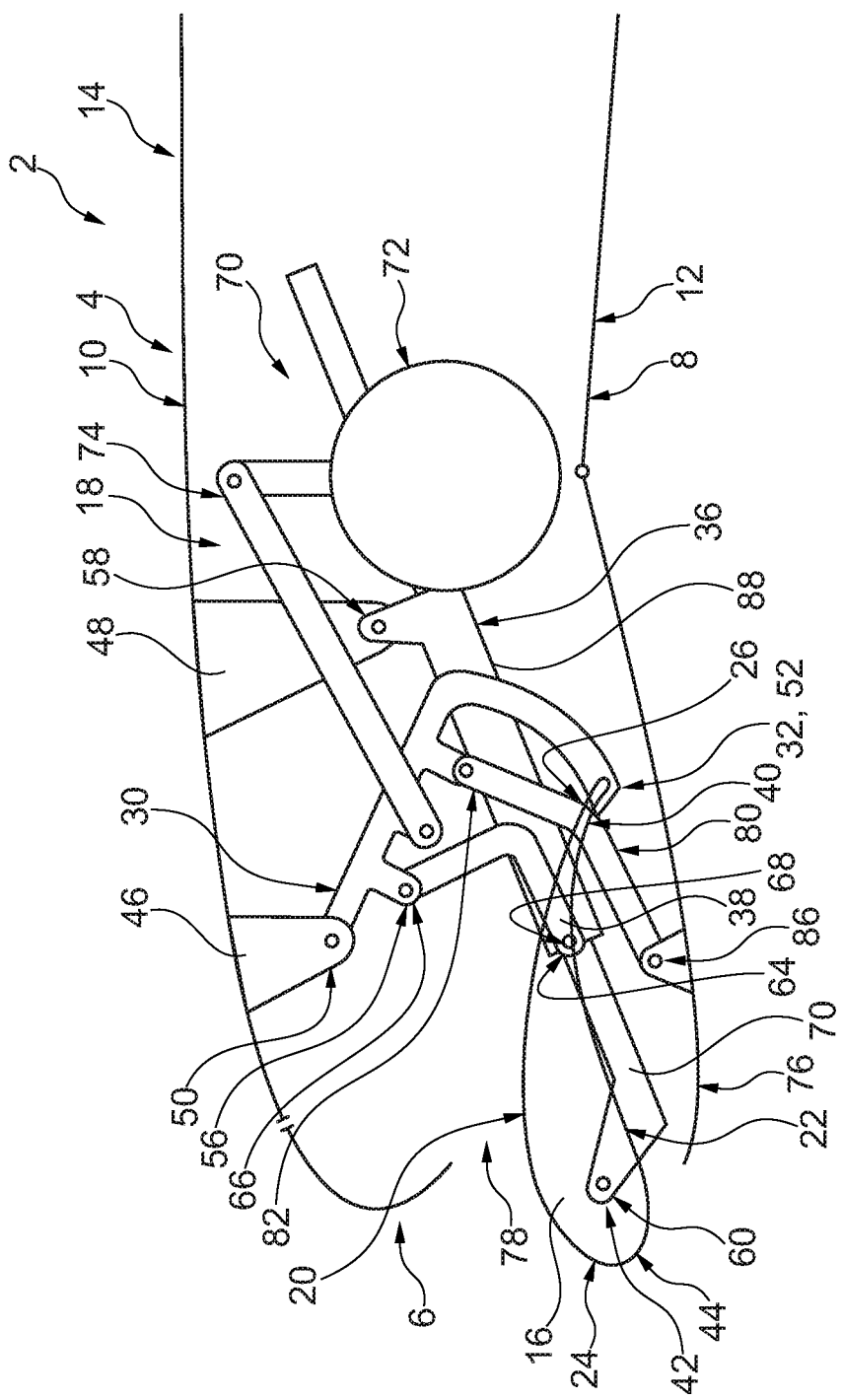
FIG. 2 schematically illustrates in a further example the aircraft wing comprising the system in a cross-sectional view.
Figure 3:
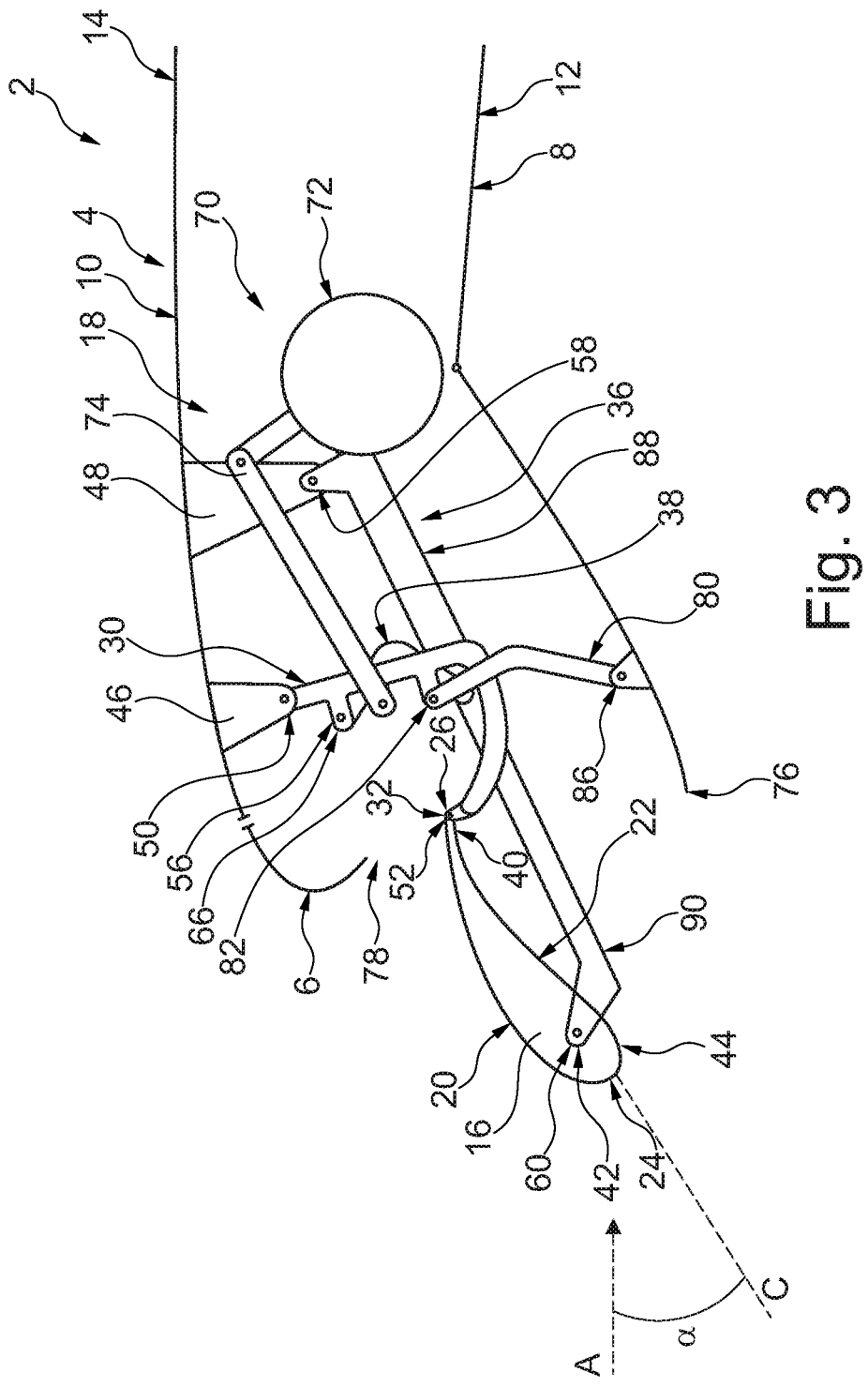
FIG. 3 schematically illustrates in a further example the aircraft wing comprising the system in a cross-sectional view.

The FIGS. 2 and 3 show states and positions of the system 18 and the slat 16, respectively, during the movement of the slat 16 between its retracted position and operation position. From the combination of the FIGS. 1, 2, 3 and 5 it can be taken that the system 18 is configured to drive the slat 16 along a trajectory, such that the forward leading edge 24 of the slat 16 is constantly forward of the rear trailing edge 26 of the slat 16. This movement prevents that the slat 16 is positioned broadside in the airstream and therefore allows to drive the slat 16 with low power requirements for the system 18. In particular, FIG. 3 shows that angle of attack α between an air stream direction A and a chord line C of the slat 16 is smaller than 90°, which otherwise would correspond to broadside orientation of the slat 16.

In order to ensure a decrease of the angle of attack during the last third of the movement of the slat 16 from the retracted position to the operating position, the system comprises a first, single piece, curved shaped arm device 30, which is also referred to as the first arm device 30. Preferably, the curved shaped arm device 30 is J-shaped or L-shaped. Thus, the curved shaped arm device 30 does not necessarily have a constant curvature. Instead, the curved shaped arm device 30 may be curved at least at its last third end section, where the first connection junction 50 is located. Further, a mean curvature of a first third end section of the arm device 30 may be smaller than a mean curvature of the last third end section of the first arm device 30. Further, the curved shaped arm device 30 may be arched shaped. The first arm device 30 is rotatably connected to the aircraft wing structure 14, such that a corresponding pivotable end 32 may be rotated between a first pivot position, as exemplarily shown in FIG. 1, being arranged within the aircraft wing 2 and a second pivot position, as exemplarily shown in FIG. 5, at least partly encompassing the leading edge 6 of the aircraft wing 2 to be arranged in front of it. The curved shape of the first arm device 30 is preferably formed as an approximate J-shape. As a result, the curved shape of the first arm device 30 prevents a collision with the leading edge surface panel 6 of the aircraft wing 2 during the explained movement of the slat 16.

The curved shape of the first arm device 30 may provide the effect that the slat 16 may be moved during the last third, in particular during the last fifth, of the deployment movement of a slat 16 between the retracted position and the operating position, such that the rear trailing edge 26 of the slat 16 is moved upward above the leading edge of the aircraft wing 2. As a result, the forward leading edge 24 may also be moved upward during said last third, in particular during the last fifth, of the deployment movement, such that an enhanced flow, in particular an enhanced laminar flow, may be provided.

Further, the curved shape of the first arm device 30 may provide the effect that the slat 16 may be moved during the last third, in particular during the last fifth, of the deployment movement of a slat 16 between the retracted position and the operating position, such that the rear trailing edge 26 of the slat 16 is in overlap with the leading edge surface panel 6 of the aircraft wing 2, because the first arm device 30 may, due to its curvature, encompass the leading edge surface panel 6 of the aircraft wing 2 at least partly. As a result, the slat 16 may be subject to a backward movement during the previously-mentioned last third or fifth of the deployment movement. As a consequence, the lift coefficient may be increased.

Furthermore, the system 18 is preferably configured such that a change of the angle of attack α of the slat 16 with respect to the air stream direction A is higher during the second third of the deployment movement than during the first third of the deployment movement or the last third of the deployment movement. Further, the change of the angle of attack α of the slat 16 with respect to the air stream direction A may be kept small, in particular smaller than 40°, during the first and/or last third of the deployment movement of the slat 16. As an effect, a rather translational movement may be performed at the first and/or last third of the deployment movement of the slat 16. This allows to drive the slat 16 out of the aircraft wing 2 during the first third of the deployment movement.

The system further comprises a second, linearly extendable arm device 36, which is also referred to as the second arm device 36. The second arm device 36 is rotatably connected to the aircraft wing structure 14 and linked to the first arm device 30 via a third arm device 38, such that a rotation of the second arm device 36 is driven by a rotation of the first arm device 30. Further, the pivotable end 32 of the first arm device 30 is rotatably connected to a rear portion 40 of the slat 16, or at least configured therefor. Furthermore, a pivotable end 42 of the second arm device 36 is rotatably connected to a front portion 44 of the slat 16, or at least configured therefor. As a result, the first arm device 30 may at least indirectly drive the rotation of the second arm device 36. In case the slat 16 is rotatably connected to the first and second arm devices 30, 36, the first arm device 30 primarily drives the slat 16. Since the second arm device 36 is also rotatably connected to the slat 16, the second arm device 36 is extended based on the linkage between the first arm device 30 and the second arm device 36 provided by the slat 16. As a result, the extension of the second arm device 36 may be referred to as a passive extension, since the extension of the second arm device 36 is not actively driven by the second arm device 36 as such. Instead, the first arm device 30 is at least indirectly responsible for the rotation and extension of the second arm device 36. It is to be noted, that a movement of the slat 16 from the operation position to the retracted position will cause a reverse change in the rotation and extension of the second arm device 36.

Considering the system 18 in further detail, the system 18 comprises a first hinge support element 46 of the aircraft wing structure 14, a second hinge support element 48 of the aircraft wing structure 14, the first arm device 30, the second arm device 36 and the third arm device 38. The first arm device 30 is rotatably connected by an associated first connection junction 50 to the first hinge support element 46. The first arm device 30 comprises a second connection junction 52, which is configured to be or is rotatably connected to a rear portion 40 of the slat 16. Further, the first arm device 30 has a steady curved shape between the first connection junction 50 and the second connection junction

52. The first arm device 30 still further comprises a third connection junction 56 being arranged between the first and second connection junction 50, 52 of the first arm device 30. The third connection junction 56 of the first arm device 30 serves as a basis for a linkage between the first arm device 30 and the second arm device 36.

The second arm device 36 is linearly extendable and rotatably connected by an associated first connection junction 58 to the second hinge support element 48. Further, the second arm device 36 comprises a second connection junction 60, which is configured to be or is rotatably connected to a front portion 44 of the slat 16. The front 44 of the slat 16 is the portion of the slat 16, which borders upon the forward leading edge 24 of the slat 16. The second arm device 36 still further comprises a third connection junction 64 arranged between the first and the second connection junction 58, 60 of the second arm device 36. The third connection junction 64 of the second arm device 36 serves as the basis for linkage between the first arm device 30 and the second arm device 36.

The third arm device 38 is rotatably connected by an associated first connection junction 66 to the third connection junction 56 of the first arm device 30. Further, the third arm device 38 is rotatably connected by an associated second connection junction 68 to the third connection junction 64 of the second arm device 36. Due to its connections to the first and second arm device 30, 36, the third arm device 38 serves as a linkage between the first arm device 30 and the second arm device 36. Consequently, a rotation of the first arm device 30 about the first hinge support element 46 drives a corresponding rotation of the second arm device 36 about the second hinge support element 48. The first hinge support element 46 is arranged forward to the second hinge support element 48, such that a rotation of the first arm device 30 results in a smaller rotation of the second arm device 36.

In order to initiate a rotation of the first arm device 30, the system comprises a drive unit 70. The drive unit 70 preferably comprises a hydraulic and/or an electrical rotary actuator 72. The actuator 72 is preferably connected to the first arm device 30 via a further arm device 74. In particular, the drive unit 70 is configured to drive the first arm device 30 at least between a first pivot position, as exemplarily shown in FIG. 1, and a second pivot position, as exemplarily shown in FIG. 5. Instead of driving the first arm device 30, the drive unit 70 may be configured to drive the second arm device 36 and/or the third arm device 38. Due to the linkage between the first, second and third arm device 30, 36, 38, a respective movement and/or rotation may be provided.

In the first pivot position of the first arm device 30, as exemplarily shown in FIG. 1, the system 18 is configured to arrange the slat 16 in a retracted position fully arranged within the aircraft wing 2. As can be seen from FIG. 1, the slat 16, in particular its lower surface panel 22, does not form a part of the lower surface panel 8 of the aircraft wing 2. Accordingly, the slat 16 may have an arbitrary outer shape. Thus, the shape of the slat 16 may be formed, such that a higher lift coefficient may be provided, when the slat 16 is in its operation position, as it is exemplarily shown in FIG. 5.

In order to drive the slat 16 from the retracted position to the operation position, the aircraft wing 2 preferably comprises a bottom panel 76 at the lower surface panel 8. The bottom panel 76 is preferably rotatably connected to the (remaining) lower surface panel 8 of the aircraft wing 2. In order to move the slat 16 out of the aircraft wing 2, the bottom panel 76 opens a gap in the surface at the lower surface panel 8 of the aircraft wing, such that a lower opening 78 is provided. FIGS. 2 and 3 show, how the bottom panel 76 may be rotated, in order to provide the lower opening 78, through which the slat 16 may be moved downward and forward in order to reach the operation position.

Even though it is not shown in the figures, the system 18 may comprise a further drive unit being configured to move the bottom panel 76. The further drive unit may be controlled, such that the bottom panel 76 is moved to provide the lower opening 78 for the slat 16, if a movement of the slat 16 from the retracted position to the operation position, or vice versa, is initiated. At least if the slat 16 is in its retracted position, the further drive unit is controlled, such that the bottom panel 76 closes the lower opening 78, in order to provide a smooth lower surface profile of the aircraft wing 2.

FIGS. 1 to 5 show an alternative embodiment for driving the bottom panel 76. For this embodiment, the system 18 further comprises a fourth arm device 80, which is linked to one of the remaining arm devices 30, 36, 38 of the system 18. Preferably, the fourth arm device 80 is linked to the first arm device 30. Considering this embodiment in further detail, the first arm device 30 comprises a fourth connection junction 82, wherein the fourth arm device 80 is rotatably connected by an associated first connection junction 84 to the fourth connection junction 82 of the first arm device 30 and wherein the fourth arm device 80 is rotatably connected by an associated second connection junction 86 to the bottom panel 76. As a result, a rotation of the first arm device 30 will cause a rotation of the bottom panel 76 due to its linkage by the fourth arm device 80. Instead of rotating the bottom panel 76, the bottom panel 76 may alternatively be linearly shifted or moved in another way, such that the lower opening 78 is provided.

During the rotation of the first arm device 30 from its first pivot position to its second pivot position, the second arm device 36 is linearly extended, as it is shown in FIGS. 2 and 3. The extension of the second arm device 36 is forced by the first arm device 30, since the slat 16 provides a linkage between the pivotable ends 32, 42 of the first and second arm devices 30, 36, respectively. Therefore, the system 18 is configured to drive the slat 16 from the retracted position to the operation position along a trajectory, such that the forward leading edge 24 of the slat 16 is constantly forward to the rear leading edge 26 of the slat 16. Consequently, the slat is oriented in its retracted position, in its operation position and in any position therebetween, such that the forward leading edge 24 of the slat 16 is forward to the rear trailing edge 26 of the slat 16.

Figure 4:
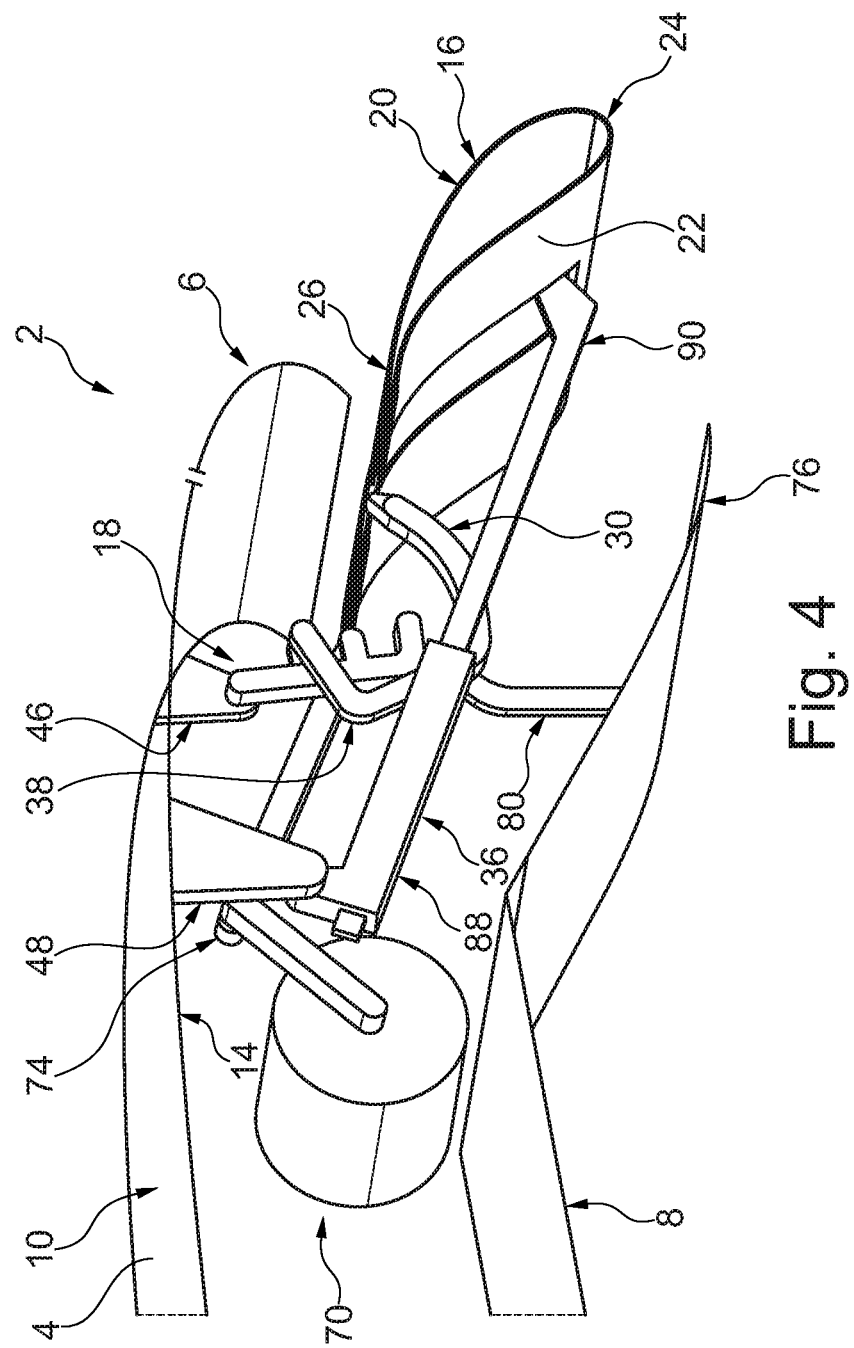
FIG. 4 schematically illustrates in a further example the aircraft wing comprising the system in a perspective view.

FIG. 4 shows the aircraft wing 2 as well as the system 18 in a schematic, perspective view, which corresponds to the cross-sectional view provided in FIG. 3. With regard to the second arm device 36, it can be seen, that the second arm device 36 comprises, in a preferred embodiment, a first shaft element 88 and a second shaft element 90. The first and second shaft elements 88, 90 are connected by a linear guide mechanism, which is preferably formed by the first and second shaft elements 88, 90 itself. In particular, the linear guide mechanism is formed as a parallel guide or a curved guide. The linear guide mechanism is configured to provide a translational shift between the first and second shaft elements 88, 90, such that the second arm device 36 is linearly extendable. It can further be taken from FIG. 4, that the extension of the second arm device 36 is passively driven by the first arm device 30, being linked to the second arm device 36, and in more detail to the second shaft element 90, via the slat 16. In order to provide this passive extension of the second arm device 36, the first shaft element 88 is rotatably connected by the associated first connection junction of the second arm device 36 to the second hinge support element 48. The first shaft element 88 further comprises the associated third connection junction 64 of the second arm device 36, such that the first shaft element 88 is linked via the third arm device 38 with the first arm device 30. The second shaft element 90 comprises the associated second connection junction 60 of the second arm device 36, in order to be rotatably connected to the front portion 44 of the slat 16.

Figure 6:
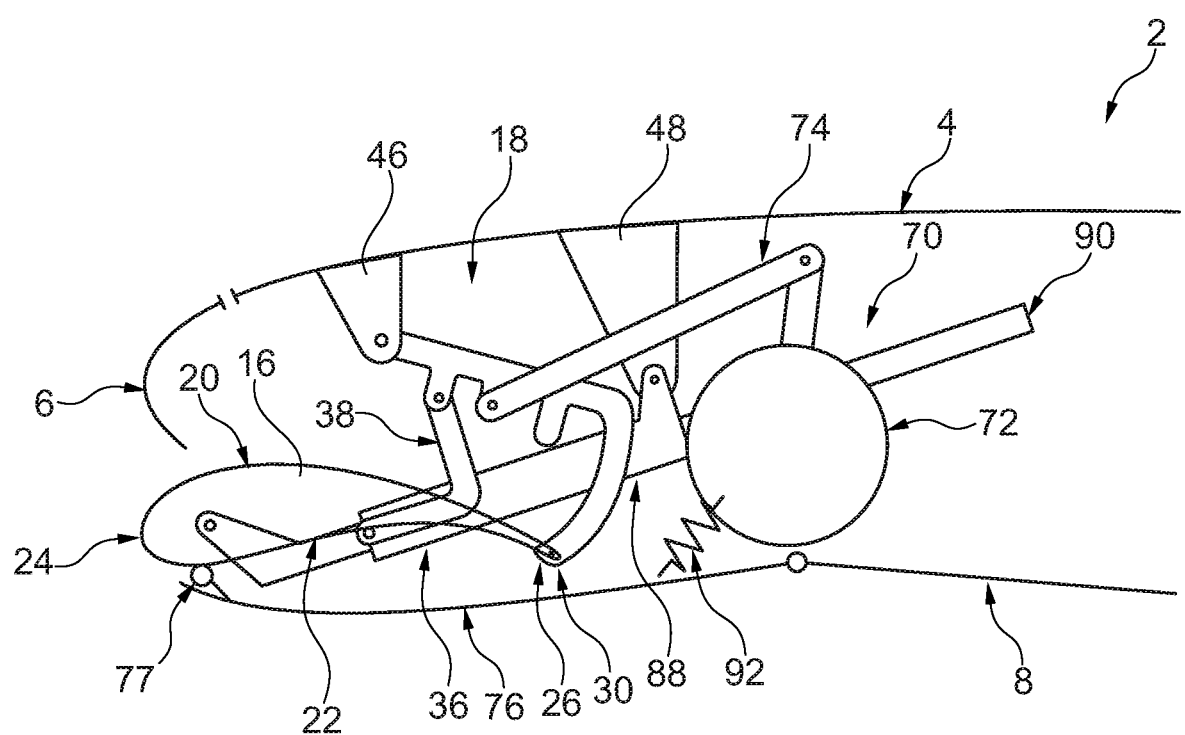
FIG. 6 schematically illustrates in a further example the aircraft wing comprising the system in a cross-sectional view.
Figure 7:
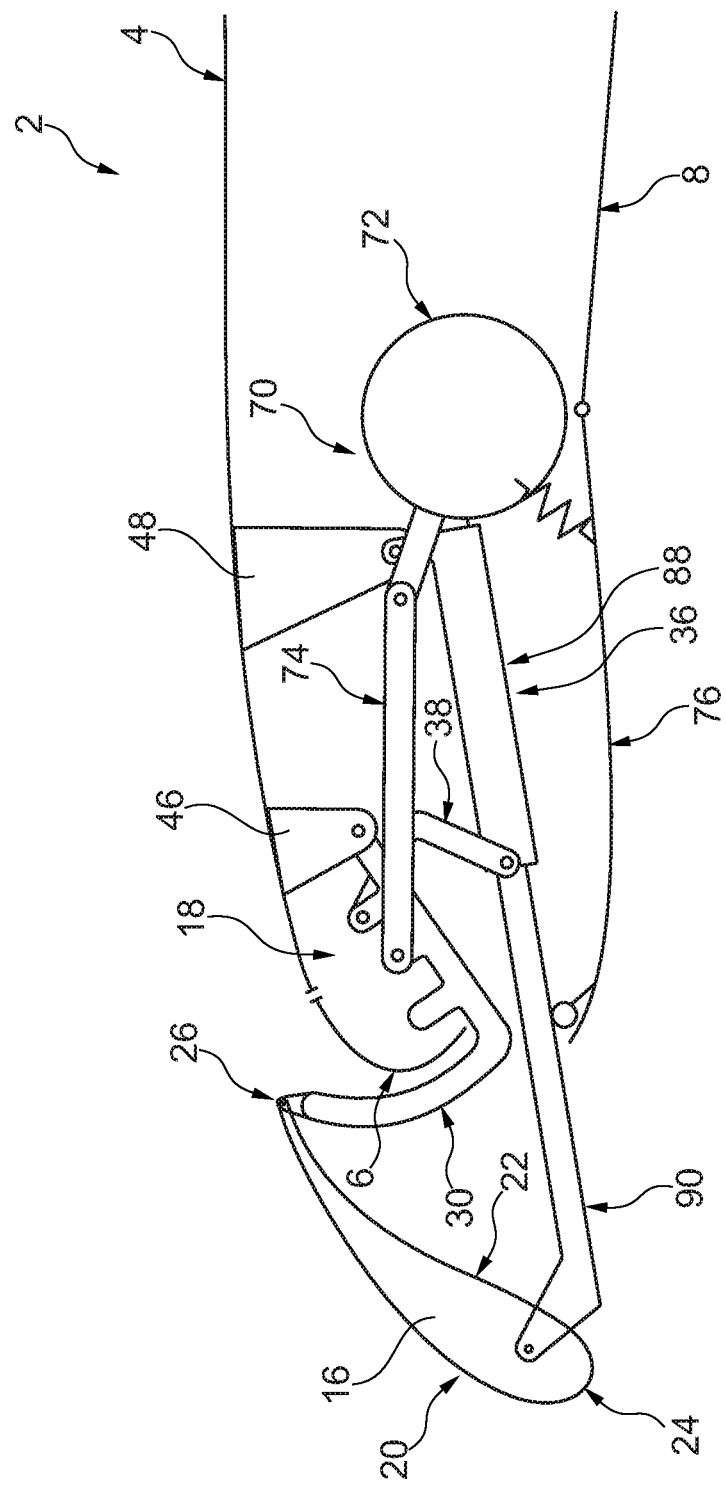
FIG. 7 schematically illustrates in a further example the aircraft wing comprising the system in a cross-sectional view.

FIG. 6 shows in a schematic, cross-sectional view a further embodiment of the aircraft wing 2 and/or the system 18. The bottom panel 76 is connected via an elastic element 92, in particular a spring, to the aircraft wing structure 14 or the drive unit 72, such that a tensile load is applied to the bottom panel 76 forcing the bottom panel 72 to close the lower opening 78. When driving the slat 16 from the retracted position to the operation position, one of the arm devices 30, 36, 38, in particular the second arm device 36, and/or the slat 16 pushes against the inside surface bottom panel 76 or a roller element 77 arranged on the inside surface of the bottom panel 76, such that the bottom panel 76 moves to open the lower surface 12 to provide the lower opening 78. Due to the tensile load applied to the bottom panel 76, the bottom panel 76 opens just as far as needed for the movement of the slat 16. In particular, the bottom panel 76 closes automatically as far as possible due to the spring tension load, in particular while the slat 16 is in its operation position, as exemplarily shown in FIG. 7. As a result, air drag resulting from moving the bottom panel 76 may be kept as low as possible.

Figure 8:
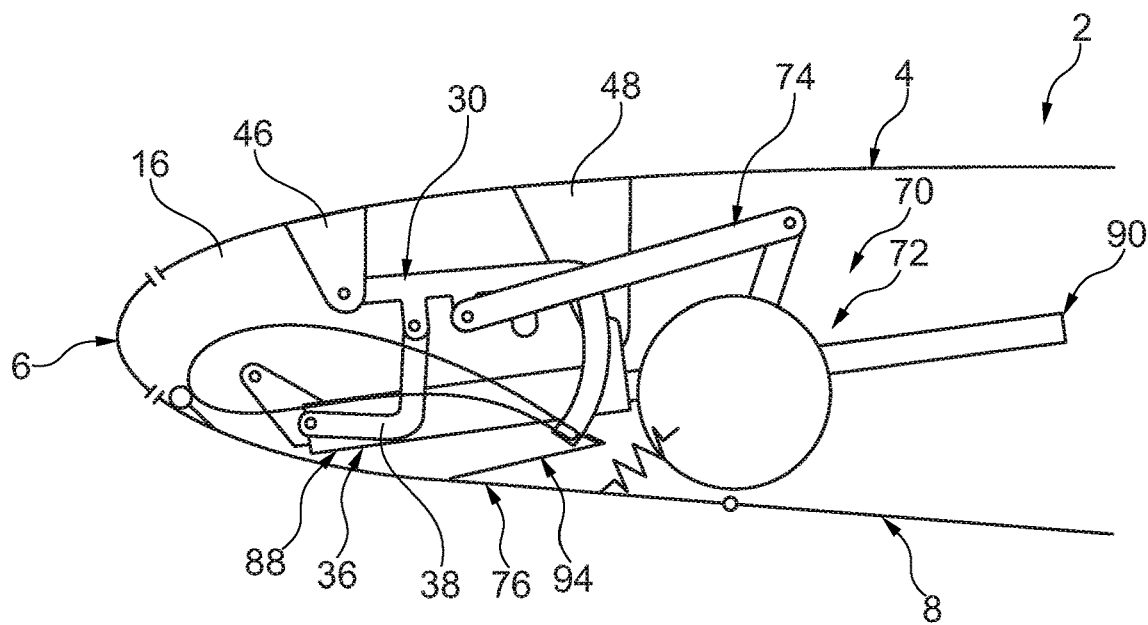
FIG. 8 schematically illustrates in a further example the aircraft wing comprising the system in a cross-sectional view.
Figure 9:
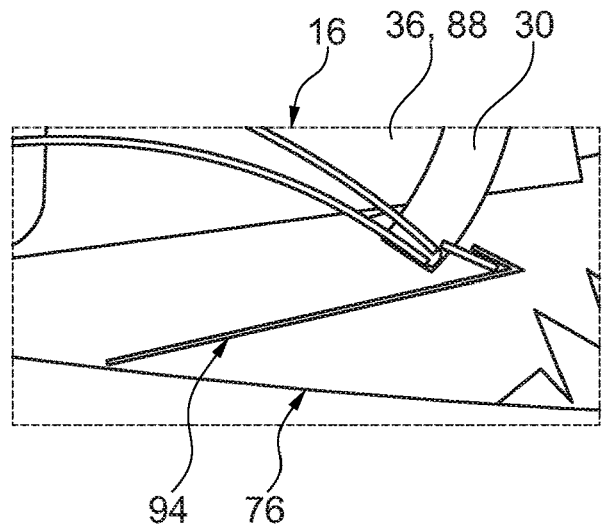
FIG. 9 schematically illustrates a lock mechanism for the bottom panel of the aircraft wing comprising in a cross-sectional view.

According to a further exemplarily embodiment shown in the schematic, cross-sectional views of FIGS. 8 and 9, the system 18 is configured to lock the bottom panel 76, if the slat 16 is in its retracted position. In particular, the first arm device 30 links to a flange element 94 arranged at the bottom panel 76, resulting in a forced closure of the bottom panel 76, when the first arm device 30 reaches its first pivot position.

Figure 10:
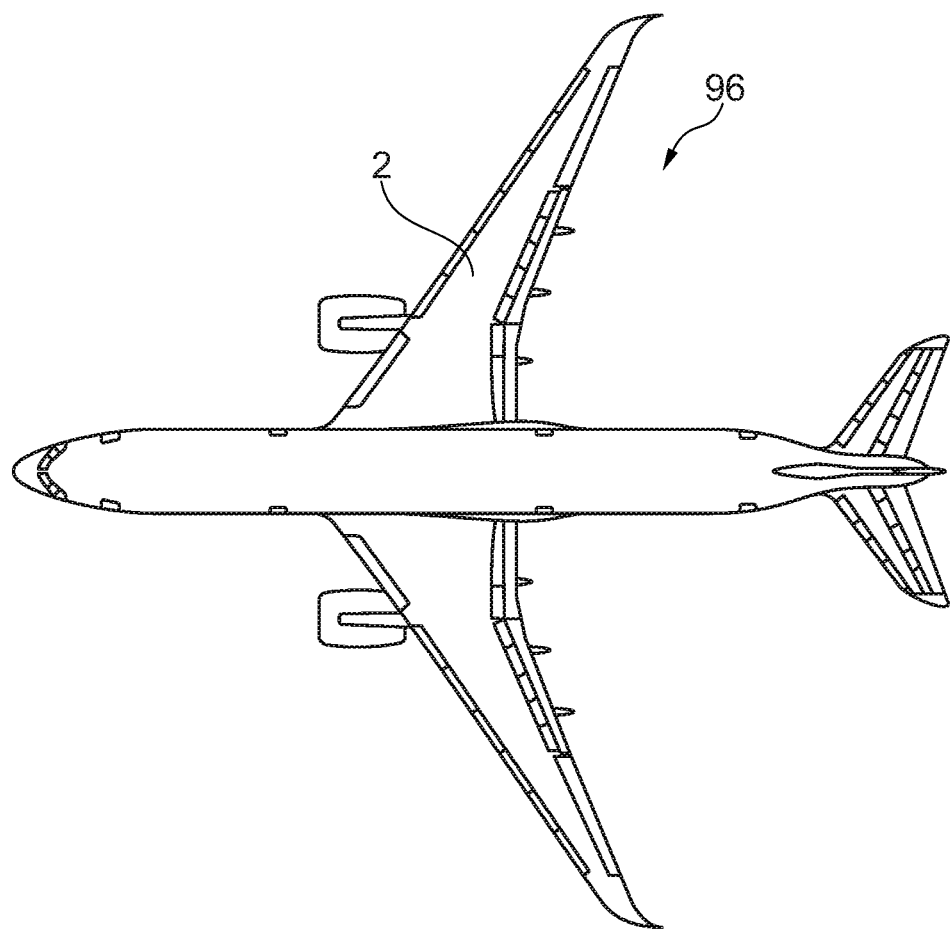
FIG. 10 schematically illustrates an example of an aircraft comprising an aircraft wing in a top-view.

FIG. 10 schematically shows a top view of an aircraft 96 comprising the aircraft wing 2.

According to a further preferred embodiment of the invention, a method for driving the slat 16 of an aircraft 96 is provided. The method comprises the step a) of driving the slat 16 out of the lower opening 78 of the aircraft wing 2 in a downward and forward movement. Preferably, the forward leading edge 24 of the slat 16 is forward to a rear trailing edge 26 of the slat 16 during the aforementioned driving step a). A corresponding movement of the slat 16 can be recognized from the synopsis of the FIGS. 1 and 2, wherein the slat 16 is at least basically subject to a parallel movement out of the interior of the aircraft wing 2 through the lower opening 78. As a result, the bottom panel 76 has to be pivoted just about a small pivoting angle, which reduces a respective drag.

According to a further step b) of the method, the slat 16 is driven thereafter in an upward and forward movement in front of the aircraft wing 2. Preferably, the forward leading edge 24 of the slat 16 remains forward of the rear trailing edge 26 of the slat 16. A respective movement is apparent from the synopsis of the FIGS. 2, 3 and 5. As can be taken from the combination of FIGS. 2 and 3, the slat 16 is basically moved forward and upward at the same time. However, as can be taken from FIG. 3, and as a result of the curved shape of the first arm device 30, the rear trailing edge 26 of the slat 16 is subject to a larger upward movement than the forward leading edge 24 of the slat 16 during the movement step b). In particular, the angle of attack α between the airstream direction A and the chord line C of the slat 16 changes mainly during this step b). In other words, a larger decrease of the angle of attack α is performed during step b) than during the movement of step a).

The method further comprises the step c) of driving the slat 16 thereafter in an upward and backward movement. Preferably, the forward leading edge 24 of the slat 16 remains forward to the rear trailing edge 26 of the slat 16. A corresponding movement of the slat 16, at least basically, results from the curved shape of the first arm device 30, since its curved end section may be configured to encompass the forward leading edge surface panel 6 of the aircraft wing 2, such that the rear trailing edge 26 is driven to the upside of the aircraft wing 2 and further such that the rear trailing edge 26 is in overlap with the forward leading edge surface panel 6 of the aircraft wing 2. As a result, a gap 28 between the rear trailing edge 26 of the slat 16 and the surface of the aircraft wing 2 may be kept small, which increases the lift coefficient and enhances a flow, in particular a laminar flow.

While certain embodiments of the invention have been illustrated and described in detail in the drawings and foregoing description, such illustration and description are to be considered illustrative or exemplary and not restrictive. The claimed subject matter is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. For example, an arm device or other units may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. A system for driving slats of an aircraft, the system comprising:
   a first hinge support element of an aircraft wing structure;
   a second hinge support element of the aircraft wing structure;
   a first arm device comprising a first connection junction, a second connection junction, and a third connection junction, the first arm device having a steady curved shape between the first connection junction and the second connection junction;
   a second arm device comprising a first connection junction, a second connection junction, and a third connection junction; and
   a third arm device comprising a first connection junction and a second connection unction;
   wherein the first arm device is rotatably connected by the first connection junction of the first arm device to the first hinge support element, the second connection junction of the first arm device is configured to be rotatably connected to a rear portion of a slat, and the third connection junction of the first arm device is arranged between the first connection junction of the first arm device and the second connection junction of the first arm device;
   wherein the second arm device is linearly extendable and rotatably connected by the first connection junction of the second arm device to the second hinge support element, the second connection junction of the second arm device is configured to be rotatably connected to a front portion of the slat, and the third connection junction of the second arm device is arranged between the first connection junction of the second arm device and the second connection junction of the second arm device; and wherein the third arm device is rotatably connected by the first connection junction of the third arm device to the third connection junction of the first arm device, and the second connection junction of the third arm device is rotatably connected to the third connection junction of the second arm device.

2. The system according to claim 1, wherein the first arm device comprises a J-shaped cross profile or an L-shaped cross profile.

3. The system according to claim 2, wherein the second arm device comprises a first shaft element and a second shaft element, and wherein the first and second shaft elements are connected by a linear guide mechanism configured to provide a translational shift between the first and second shaft elements, such that the second arm device is translationally and/or linearly extendable.

4. The system according to claim 3, wherein the first shaft element is rotatably connected by an associated first connection junction to the second hinge support element and comprises an associated third connection junction, and wherein the second shaft element comprises an associated second connection junction.

5. The system according to claim 1, wherein the first arm device is rotatable about the first hinge support element at least between a first pivot position and a second pivot position, wherein in the first pivot position, the system is configured to arrange the slat in a retracted position within an aircraft wing, such that a forward leading edge of the slat is forward of a rear trailing edge of the slat.

6. The system according to claim 5, wherein in the second pivot position of the first arm device, the system is configured to arrange the slat in an operation position outside the aircraft wing, such that the rear trailing edge of the slat is forward of a forward leading edge of the aircraft wing or is arranged above and in overlap with the forward leading edge of the aircraft wing.

7. The system according to claim 6, wherein the system is configured to drive the slat from the retracted position to the operation position along a trajectory, such that the forward leading edge of the slat is constantly forward of the rear trailing edge of the slat.

8. The system according to claim 1, wherein the first arm device comprises a fourth connection junction, wherein the system comprises a fourth arm device rotatably connected by an associated first connection junction to the fourth connection junction of the first arm device, and wherein the fourth arm device comprises a second connection junction configured to be rotatably connected to the bottom panel of the aircraft wing.

9. An aircraft comprising a system according to claim 1.

10. An aircraft wing for an aircraft, comprising:
an aircraft wing structure;
a slat; and
a system comprising:

a first hinge support element of the aircraft wing structure;
a second hinge support element of the aircraft wing structure;
a first arm device comprising a first connection junction, a second connection junction, and a third connection junction, the first arm device having a steady curved shape between the first connection junction and the second connection junction;
a second arm device comprising a first connection junction, a second connection junction, and a third connection junction; and
a third arm device comprising a first connection junction and a second connection junction;
wherein the first arm device is rotatably connected by the first connection junction of the first arm device to the first hinge support element, the second connection junction of the first arm device is configured to be rotatably connected to a rear portion of the slat, and the third connection junction of the first arm device is arranged between the first connection junction of the first arm device and the second connection junction of the first arm device;
wherein the second arm device is linearly extendable and rotatably connected by the first connection junction of the second arm device to the second hinge support element, the second connection junction of the second arm device is configured to be rotatably connected to a front portion of the slat, and the third connection junction of the second arm device is arranged between the first connection junction of the second arm device and the second connection junction of the second arm device;
wherein the third arm device is rotatably connected by the first connection junction of the third arm device to the third connection junction of the first arm device, and the second connection junction of the third arm device is rotatably connected to the third connection junction of the second arm device;
wherein the first and second hinge support elements are arranged within the aircraft wing and attached to the aircraft wing structure;
wherein the second connection junction of the first arm device is rotatably connected to the rear portion of the slat; and
wherein the second connection junction of the second arm device is rotatably connected to a front portion of the slat.

11. The aircraft wing according to claim 10, wherein the first hinge support element is arranged at a first internal, forward leading section of the aircraft wing structure, and wherein the second hinge support element is arranged rearward the first section of the aircraft wing structure at a second internal section of the aircraft wing structure.

12. The aircraft wing according to claim 10, wherein the aircraft wing comprises a bottom panel, wherein the system is configured to move, in particular pivot, the bottom panel from a closed position to an open position before or while rotating the first arm device from the first pivot position to the second pivot position.

* * * * *